K. HIGGINSON.
APPARATUS FOR CINEMATOGRAPHIC PROJECTION.
APPLICATION FILED JUNE 11, 1920.

1,409,107.

Patented Mar. 7, 1922.

Inventor
Kingsley Higginson,
by Bakewell, Byrnes & Parmelee
his Attys.

UNITED STATES PATENT OFFICE.

KINGSLEY HIGGINSON, OF LONDON, ENGLAND, ASSIGNOR TO CAREY-GAVEY SYNDICATE LIMITED, OF LONDON, ENGLAND.

APPARATUS FOR CINEMATOGRAPHIC PROJECTION.

1,409,107. Specification of Letters Patent. Patented Mar. 7, 1922.

Application filed June 11, 1920. Serial No. 388,158.

*To all whom it may concern:*

Be it known that I, KINGSLEY HIGGINSON, a subject of the King of England, residing in London, England, have invented certain new and useful Improvements in Apparatus for Cinematographic Projection, of which the following is a specification.

This invention relates to cimematograph projection apparatus of the type provided with a rotatable mirror whereof the reflecting surface is composed of a number of trapezoidal facets and which is provided with means to move it continuously in one direction synchronously with the film, the arrangement being such and the size and shape of the trapezoidal facets being such that when a whole picture is in the gate it is projected on to a single facet and is therefrom reflected bodily on to the screen, and moreover such that as the picture leaves the gate, the trailing edge of the picture is always kept at the same part of the screen. Difficulty has heretofore been experienced with apparatus of this type owing to the relatively large degree of movement of the lateral edges of each picture on the screen during the period in which that picture is reflected from a single facet, and the object of the present invention is to reduce this movement to a magnitude that is more tolerable to the observer.

The present invention provides cinematograph apparatus of the type described characterized by the facets of the mirror being placed end to end as an endless band (for example so as to constitute the frustum of an equi-angular pyramid) upon a support mounted to move them in succession across the optical axis of the projector in such a manner that the projected beam enters one open side of the mirror and after reflection thereby emerges from the opposite open side of the mirror.

Further according to this invention the apparatus may be so constructed that the film is guided in such a manner as to have its plane when in the gate inclined to the optical axis of projection in that direction in which the inclination between its plane and the plane of the facet of the mirror by which it is reflected, is less than it would be if the plane of the film were at right-angles to the said axis.

This invention is now further described with reference to the accompanying drawings, in which—

Figure 1:
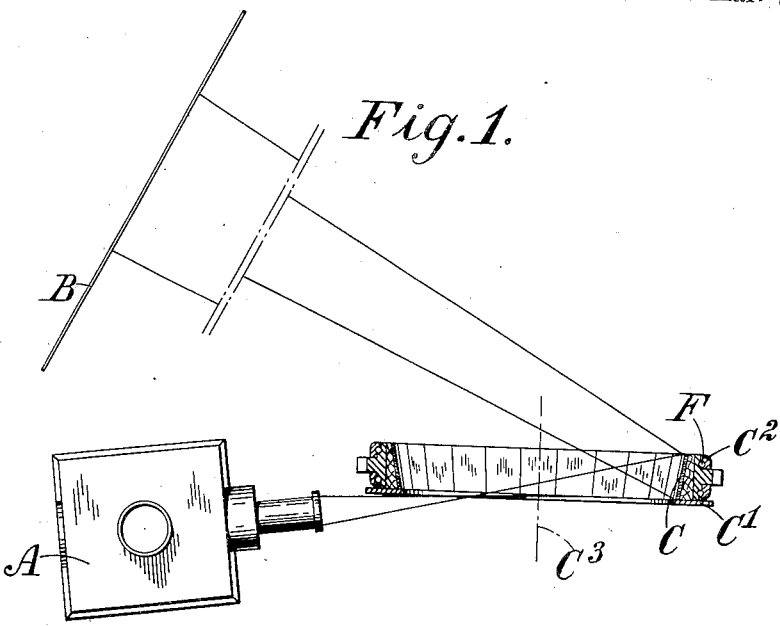
Figure 1 is a general diagram in plan illustrating the path of the projected beam in apparatus according to this invention.

Referring to Figure 1, the apparatus comprises a projection lantern of any convenient construction, indicated at A, but arranged, not as is customary, to throw its beam directly upon the screen which is indicated at B, but so as to throw a beam on to a mirror indicated at C, from which the image is reflected on to the screen. In result the projector is arranged with its back to the screen. The mirror C is arranged to rotate about a horizontal axis $C^3$ and is in the form of an endless band of facets D supported as the frustum of an equi-angular pyramid upon an annular table or support $C^1$. The mirror is supported, as indicated diagrammatically in Figure 1 but in fuller detail in Figure 2, to run on ball or roller bearings in an annular guide $C^2$.

It will readily be appreciated that since the film is travelling downwards through the gate of the projector the direction of rotation of the mirror must be such that the facet which is receiving and reflecting the projected image is travelling in an upward direction in order that the picture may remain stationary upon the screen.

Figure 2:
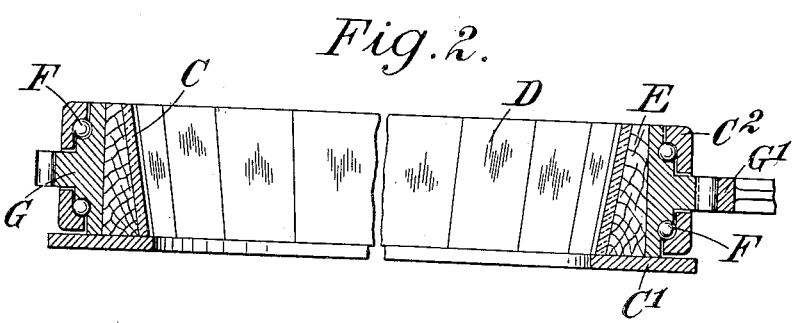
Figure 2 is a section through a rotating mirror according to this invention, the plane of section being that which contains the axis of rotation of the mirror.

Referring now to Figure 2, the mirror C will be seen to be composed of a number of facets D each of trapezoidal form but only departing sufficiently from a rectangular form to enable the beam to be projected into one open side of the mirror and reflected from the other. Each facet has to be of just such dimensions that the light-beam falling upon it fully occupies it when a whole picture is in the gate, and it will readily be understood that since the projected beam is necessarily inclined to the general plane of rotation of the mirror, the image received upon a facet would not be rectangular in shape even if the facet were rectangular and at right-angles to the plane of its rotation.

The facet is therefore made slightly wider at the side more remote from the projector than at the side nearer to it, that is to say, wider at the upper side, as viewed in Figure 1, than at the lower side. The result of this arrangement is that the facets when put end to end in band-like arrangement constitute the frustum of an equi-angular pyramid as indicated in the drawing.

The band of facets constituting the mirror is mounted upon a support E of substantial construction carried upon the table C¹ and arranged to revolve in ball races F. Rotative effort is applied to drive the mirror through a toothed ring G driven by a pinion G¹ from an electric motor or in any other convenient way. It is obvious that the rotational movement of the mirror must be carefully synchronized with the movement of the film through the gate and this is effected by mechanical gearing interconnecting the wheel G with the feed mechanism for the film. Such gearing is not shown in the drawing, and per se forms no part of the present invention, it being obvious to any one skilled in the art how to provide mechanism for this necessary result.

Figure 3:
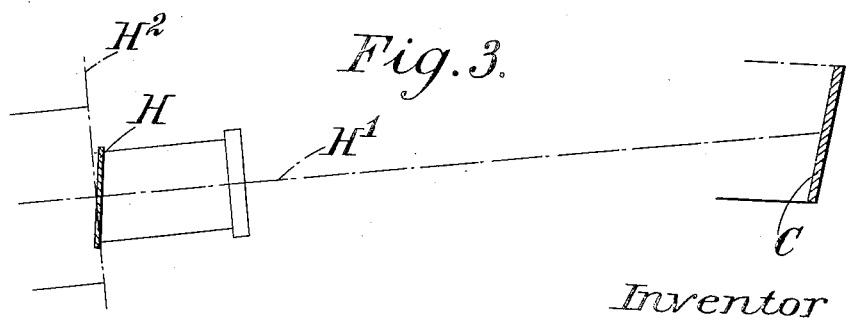
Figure 3 is a diagram illustrating the inclination of the film in the gate to the axis of projection.

In order to diminish the distortion which occurs at the lateral edges of the pictures on the screen the projector is preferably constructed so that the film while in the gate is guided to have its plane inclined, as indicated at H, in Figure 3, to the optical axis of projection H¹, the direction of the said inclination being such as to reduce the inclination of the plane of the film to the plane of the facet.

A chain line at H² indicates the plane perpendicular to the axis H¹.

What I claim as my invention and desire to secure by Letters Patent is:—

1. For use with a cinematograph projector having a continuously moving film, a rotatable mirror constituted by a simple band of facets, each in the form of a plane mirror, arranged in the form of a frustum of a pyramid adapted to be placed between the projector lens and a screen, and to reflect by a single incidence through the one open side of the mirror the incident beam that enters the annular mirror through the other open side thereof and falls upon said band.

2. For use with a cinematograph projector having a continuously moving film, a rotatable mirror constituted by a simple band of facets, each in the form of a plane mirror, arranged in the form of a frustum of a pyramid adapted to be placed between the projector lens and a screen, and to reflect by a single incidence through the open side of larger diameter of the mirror the incident beam that enters the annular mirror through the side thereof of smaller diameter so as to make a small angle (that is to say an angle less than 30°) with the plane of rotation of the mirror.

3. In cinematograph apparatus, the combination with a cinematograph projector having a continuously moving film, and a screen, of a rotatable mirror composed of a simple band of trapezoidal facets, each in the form of a plane mirror, arranged in the form of a frustum of a pyramid and provided between the projector lens and the screen for receiving an incident beam from the projector and reflecting it onto the screen, the disposition of the mirror relatively to the projector and the construction of the mirror being such that the incident beam enters the annular mirror through the side of smaller diameter so as to make a small angle (that is to say an angle of less than 30°) with the plane of rotation of the mirror, falls upon the band, and by a single incidence thereupon is reflected directly to pass out through the other open side of the mirror, and that the reflecting surface of each facet makes such an angle with the reflecting surface of a contiguous facet that when the image of a line of junction corresponding to the line separating two adjacent pictures on the film falls on to the line separating two contiguous facets, a single complete composite image having its two halves juxtaposed by reflection is thrown upon the screen.

4. In cinematograph apparatus, the combination with a cinematograph projector having a continuously moving film, and a screen, of a rotatable mirror composed of a simple band of trapezodial facets, each in the form of a plane mirror, arranged in the form of a frustum of a pyramid and provided between the projector-lens and the screen for receiving an incident beam from the projector and reflecting it on to the screen, the disposition of the mirror relatively to the projector and the construction of the mirror being such that the incident beam enters the annular mirror through one open side thereof, falls upon the said band and by a single incidence thereupon is reflected directly to pass out through the other open side of the mirror, the projection of the gate upon a trapezodial facet when directly opposite to it just fills the said facet from one of its mutually inclined sides to the other, and the reflecting surface of each facet makes such an angle with the reflecting surface of a contiguous facet that, when the image of a line of junction corresponding to the line separating two adjacent pictures on the film falls on to the line separating two contiguous facets, a single complete composite image having its two halves juxtaposed by reflection is thrown upon the screen.

5. In cinematograph apparatus, the combination with a cinematograph projector having a continuously moving film, and a screen, of a rotatable mirror composed of a simple band of trapezoidal facets, each in the form of a plane mirror, arranged in the form of a frustum of a pyramid and provided between the projector lens and the screen for receiving an incident beam from the projector and reflecting it on to the screen, and disposition of the mirror relatively to the projector and the construction of the mirror being such that the incident beam enters the annular mirror through one open side thereof, falls upon the said band and by a single incidence thereupon is reflected directly to pass out through the other open side of the mirror, the plane of the film in the gate is inclined to the optical axis of the projection in such a manner that the inclination between that plane and the plane of a facet of the mirror by which it is reflected is less than it would be if the plane of the film were at right angles to the axis of projection, and each facet is equal in dimensions between its slant side to the optical projection thereon of a length of film equal to the picture-pitch.

In testimony whereof I affix my signature.

K. HIGGINSON.